(12) United States Patent
Coronado et al.

(10) Patent No.: US 7,996,707 B2
(45) Date of Patent: Aug. 9, 2011

(54) METHOD TO RECOVER FROM UNGROUPED LOGICAL PATH FAILURES

(75) Inventors: Juan A. Coronado, Tucson, AZ (US); Roger G. Hathorn, Tucson, AZ (US); Bret W. Holley, Tucson, AZ (US); Daniel J. Perkin, Tucson, AZ (US); Dinh H. Le, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 329 days.

(21) Appl. No.: 12/179,862

(22) Filed: Jul. 25, 2008

(65) Prior Publication Data

US 2010/0023801 A1 Jan. 28, 2010

(51) Int. Cl.
G06F 11/00 (2006.01)
(52) U.S. Cl. .......................................................... 714/3
(58) Field of Classification Search .................. 714/43, 714/5.1
See application file for complete search history.

(56) References Cited

U.S. PATENT DOCUMENTS

| | | | |
|---|---|---|---|
| 6,606,630 B1 * | 8/2003 | Gunlock | 1/1 |
| 6,952,734 B1 * | 10/2005 | Gunlock et al. | 709/227 |
| 7,181,553 B2 * | 2/2007 | Pooni et al. | 710/38 |
| 7,210,068 B1 * | 4/2007 | Aiello et al. | 714/43 |
| 7,634,691 B2 * | 12/2009 | Komatsu et al. | 714/43 |
| 7,653,769 B2 * | 1/2010 | Fisher et al. | 710/104 |
| 2003/0023893 A1 * | 1/2003 | Lee et al. | 714/4 |
| 2004/0098637 A1 * | 5/2004 | Duncan et al. | 714/6 |
| 2004/0267980 A1 | 12/2004 | McBrearty et al. | 710/38 |
| 2005/0097243 A1 | 5/2005 | Yamashita et al. | 710/38 |
| 2010/0023801 A1 * | 1/2010 | Coronado et al. | 714/5 |
| 2010/0050022 A1 * | 2/2010 | Komatsu et al. | 714/43 |

* cited by examiner

*Primary Examiner* — Scott T Baderman
*Assistant Examiner* — Yair Leibovich
(74) *Attorney, Agent, or Firm* — Hamilton & Terrile, LLP; Stephen A. Terrile

(57) ABSTRACT

A system and method for recovering from a single logical path failure. More specifically, although a host has not grouped its logical paths, the host knows which logical paths it has available. When a host detects a logical path failure, the host enters a path discovery mode of operation. If the host continues to detect a logical path failure while operating in the logical path discovery mode of operation, the host removes the logical path from a logical path mask, and the host does not use the removed logical path again. In the case of ungrouped logical paths, the host aborts its process because it does not have more paths available to continue its process. Additionally, in certain embodiments, a pseudo path group for ungrouped logical paths is created.

14 Claims, 6 Drawing Sheets

METHOD TO RECOVER FROM UNGROUPED LOGICAL PATH FAILURES

BACKGROUND OF THE INVENTION

1. Field of the Invention

The present invention relates to a method, system, and article of manufacture for recovering from ungrouped logical path failures.

2. Description of the Related Art

In certain computing environments, a host computer may communicate with a storage control unit, where the storage control unit controls physical storage. The physical storage that is controlled by the storage control unit may be represented logically as a plurality of logical path resources within the storage control unit. Applications in the host computer may perform input/output (I/O) operations with respect to the logical path resources of the storage control unit. For example, an application in the host computer may write to logical path resources of the storage control unit. The storage control unit may maintain a correspondence between the logical path resources and storage media in the physical storage via logical and physical volumes. While data may be physically written to the storage media in the physical storage under the control of the storage control unit, as far as an application in the host computer is concerned, the application performs write operations with respect to the logical path resources in the storage control unit.

Logical path resources may be added, deleted, or otherwise modified within the storage control unit. Certain modifications to the logical path resources of the storage control unit, such as addition of a logical path resource when no path resources are available, may cause a failure of I/O operations that are sent from the host computer to the storage control unit.

There are instances in which logical paths are not grouped. For example, at system initial program load (IPL) time, not all logical paths from a host being loaded are grouped. It has been observed that in the cases of ungrouped logical paths, a single-point-of-failure, where a single logical path fails, can prevent an operating system (such as the z/OS operating system available from International Business Machines, Inc.) from loading even if the other defined logical paths are stable.

To IPL a z/OS system attached to a storage controller, a customer often must have a physical path infrastructure in place between the host and the storage controller. The z/OS operating system is a multipath-capable operating system and so there are generally between two and eight logical paths to any given device on a storage controller subsystem.

To IPL a host, a customer previously attaches a storage controller to a processor using several physical paths and then proceeds to the processor hardware management console (HMC) seeking to initiate IPL. The customer selects a single system residence volume (SYSRES) and Input Output Definition File (IODF) device accessible in their Input Output Configuration Data Set (IOCDS), then customer provides these individual devices into a Load address and Load parameters, and the customer actuates LOAD to IPL the system.

Nucleus initialization processing starts executing and the z/OS host selects the first logical path of its available logical paths to start the IPL process. The host uses the logical path to access the production IODF device that contains the I/O configuration data that the host uses to IPL the system.

As long as the logical path is available during IPL of the host, the system loads properly. However, if there is a logical path failure, the host enters a failure mode of operation. Due to the nature of logical path failure, a logical path failure may be temporary or permanent. A temporary logical path failure may last between a few milliseconds to one or two seconds. For direct connect links, any error that lasts under 1.5 seconds is considered a nonpermanent error. When a loss of light condition is detected, the channel starts a 1.5-second timer. If the link comes back within 1.5 seconds, the logical paths are not removed.

For switched links, the time-out period is the time it takes for the state change to be propagated to the host from the switch. For example, hosts (such as the 390 hosts available from International Business Machines) then wait for 2 seconds before they will remove logical paths.

A permanent logical path error lasts forever, and the consequence is the removal of the logical path. For direct connect links, if the link is down for over 1.5 seconds, the channel will remove all logical paths on that physical link. For switched links, the time-out period is approximately 2 seconds before the channel will begin removing logical paths. One result of a temporary or permanent failure is the inability of a host to access the IODF device through the failed logical path. Since the host does not know the failure type, the host retries the I/O. For temporary failures that last a few milliseconds, the host might be able to retry the I/O successfully, and the host can continue its IPL process. For temporary failures that last seconds, a host may run out of retries within the failure window, and the host stops its IPL process. For permanent failures, a host may run out of retries, and the host stops its IPL process. After the host recovery is exhausted, the host aborts its IPL process and enters a disabled wait state.

After an aborted IPL, the customer often must then spend time analyzing the wait state. One current solution to address an aborted IPL is to simply retry the IPL. There is a chance however that the IPL will fail again because of this same I/O error. This presents an issue because after two failures the customer will be hesitant to try a third time without initiating a customer support contact, which can dramatically prolong their outage. Another possible solution is to identify the failing logical path, configure the logical path off-line, and retry the IPL. An issue with this solution is that the customer may be required to generate a stand-alone dump and rely on support to analyze the dump and inform the customer which logical path is causing the problem. Again, this process could extend the system downtime.

To address this issue, certain customers have installed automated solutions such as the Geographically Dispersed Parallel Sysplex/synchronous mirroring technology (GDPS/PPRC) available from International Business Machines, which uses business continuity plan 2 (BCPii) type automation to IPL systems. However, automated IPL solutions can also fail because of a single point of failure. Which could then require the customer to identify the problem and manually intervene, having suffered both an extended outage and having lost faith in the automated software solutions since manual intervention was necessary.

SUMMARY OF THE INVENTION

In accordance with the present invention, a system and method for recovering from a single logical path failure is set forth. More specifically, although a host has not grouped its logical paths, the host knows which logical paths it has available. When a host detects a logical path failure, the host enters a path discovery mode of operation. If the host continues to detect a logical path failure while operating in the logical path discovery mode of operation, the host removes the logical path from a logical path mask, and the host does not use the removed logical path again. In the case of ungrouped logical paths, the host aborts its process because it does not have more paths available to continue its process. Thus, the invention provides a method for a host to continue a loading process even if the host fails to recover a failed logical path.

Additionally, in certain embodiments, the system creates a pseudo path group for ungrouped logical paths. Knowledge about the pseudo path group is only at the host level. When a host initiates an IPL process or other process that does not require logical paths to be grouped, the host will invoke the pseudo path group process. In the pseudo path group process, all ungrouped logical paths known by the host are grouped internally at the host level. The host does not need to inform the storage controller that it has grouped its logical paths internally. Once the host has created its pseudo path group, the host behavior is the same as if the host has grouped its logical paths. If a host detects a logical path failure, the host moves the logical path from its working mask of pseudo path group to an intermediate failure mask. The logical path remains in the intermediate logical path mask until and unless the host determines that additional logical paths are desired. For example, additional logical paths may be desired due to completing IPL and needing to group logical paths into a path group. When the host determines that recovery of the failed logical paths is desired, the host performs a logical path discovery operation for each logical path in the intermediate logical path mask. A logical path in the intermediate logical that is successfully recovered is moved back to the working pseudo path group mask. A logical path in the intermediate logical path that cannot be recovered is moved to a permanent failure logical path.

In one embodiment, the invention relates to a method for recovering from a logical failure which includes detecting a logical path failure, entering a path discovery mode of operation upon detection of a logical path failure, performing a logical path recovery operation that removes the logical path from a group of available logical paths and performs an establish a logical path operation after removing the logical path from the group of available logical paths.

In another embodiment, the invention relates to a system that includes a processor and a computer-usable medium embodying computer program code. The computer program code comprises instructions executable by the processor and configured for detecting a logical path failure, entering a path discovery mode of operation upon detection of a logical path failure, performing a logical path recovery operation that removes the logical path from a group of available logical paths and performs an establish a logical path operation after removing the logical path from the group of available logical paths.

In another embodiment, the invention relates to a computer-usable medium embodying computer program code. The computer program code includes computer executable instructions configured for detecting a logical path failure, entering a path discovery mode of operation upon detection of a logical path failure, performing a logical path recovery operation that removing the logical path from a group of available logical paths and performs an establish a logical path operation after removing the logical path from the group of available logical paths.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION

In the following description, reference is made to the accompanying drawings which form a part hereof and which illustrate several embodiments. It is understood that other embodiments may be utilized and structural and operational changes may be made.

Figure 1:
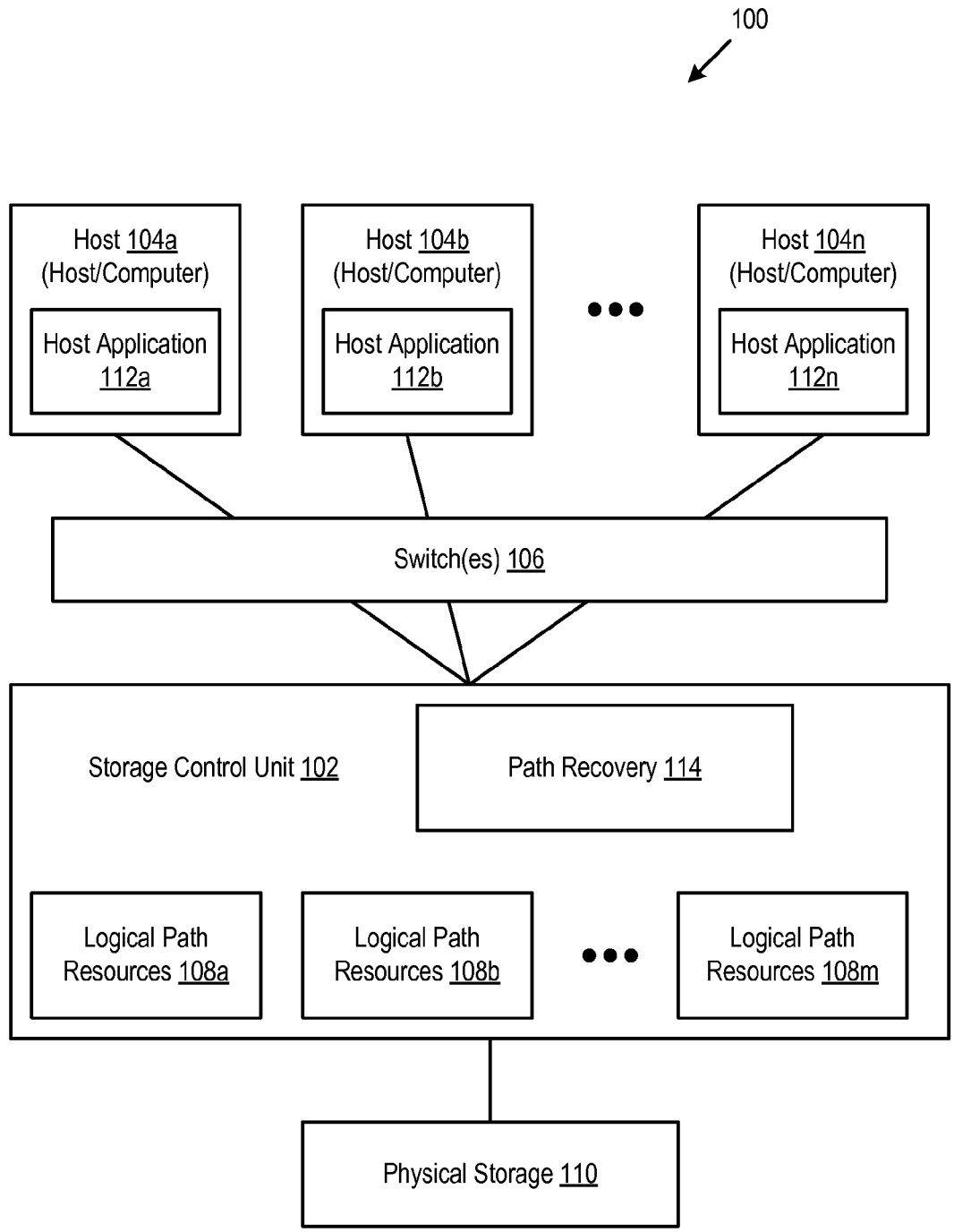
FIG. 1 illustrates a block diagram of a computing environment in accordance with certain embodiments.

FIG. 1 illustrates a block diagram of a computing environment 100 in accordance with certain embodiments of the present invention. The computing environment 100 includes a storage control unit 102 that is coupled to a plurality of hosts 104a, 104b . . . 104n over one or more switches 106. The storage control unit 102 includes logical path resources 108a, 108b . . . 108m that map to physical subsystems corresponding to a physical storage 110 that is controlled by the storage control unit 102. The plurality of hosts 104a . . . 104n include a plurality of host applications 112a, 112b . . . 112n that perform I/O operations with the logical path resources 108a . . . 108m.

The plurality of hosts 104a . . . 104n may comprise any suitable computational device including for example, a personal computer, a workstation, a mainframe, a hand held computer, a palm top computer, a telephony device, a network appliance, a blade computer, a storage server, etc. The storage control unit 102 may include any suitable computational device that controls access to the physical storage 110. The physical storage 110 may include any suitable data storage including for example disk drives, tape drives, etc. In certain embodiments, the one or more switches 106 that couple the plurality of hosts 104a . . . 104n to the storage control unit 102 may comprise Fiber Connectivity (FICON) switches. For example, FICON switches that use optical fiber technology may couple the hosts 104a . . . 104n comprising an IBM S/390 type computer or other computers to the storage control unit 102.

While FIG. 1 shows a single host application per host, in alternate embodiments a greater or a fewer number of host applications may execute in each host. Additionally, the number of host applications 112a . . . 112n that run off the plurality of hosts 104a . . . 104n may be different from the number of hosts 104a . . . 104n.

A configuration of logical path resources 108a . . . 108m in the storage control unit 102 may change because of additions, removals, or modifications to the logical path resources 108a . . . 108m. For example, an exemplary host, such as the host 104a, may establish communication with exemplary logical path resources, such as the logical path resources 108b. The logical path resources 108a . . . 108m may comprise any plurality of logical storage systems, where each logical storage system includes at least one logical storage volume corresponding to one or more physical volumes stored in the physical storage 110.

In certain embodiments, when a configuration change of the logical path resources 108a . . . 108m occurs within the storage control unit 102 that results in an out of resources condition, a path recovery application 114 implemented in the storage control unit 102 may be executed. The path recovery application 114 is also referred to as a path recovery system and may be implemented in software, hardware, firmware, or any combination thereof. Executing the path recovery application 114 allows replacing logical path resources within the computing environment 100. By executing the path recovery application 114, a host may recover a logical path when a failure is detected.

Figure 2:
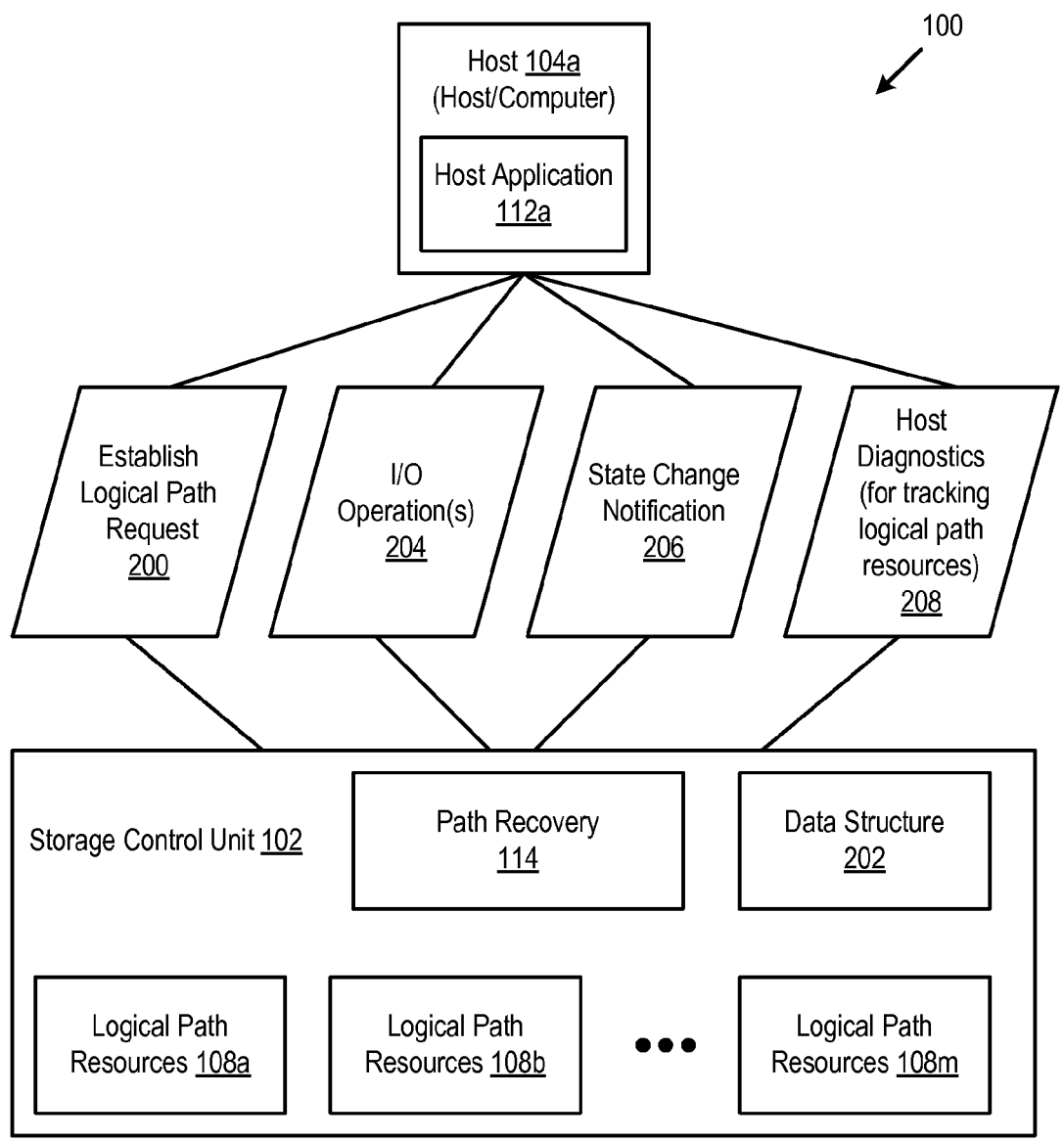
FIG. 2 illustrates a block diagram that shows how communications are preformed in the computing environment, in accordance with certain embodiments.

FIG. 2 illustrates a block diagram that shows how exemplary communications are performed in the computing environment 100, in accordance with certain embodiments. More specifically, an exemplary host 104a, selected from the hosts 104a . . . 104n, may include an exemplary host application 112a. The host application 112a may send an 'establish logical path' request 200 to the storage control unit 102, where the 'establish logical path' request 200 seeks to access a logical path resource 108a . . . 108m of the storage control unit 102. The path recovery application 114 or some other application implemented in the storage control unit 102 enables the storage control unit 102 to recover from a logical path failure.

Once a logical path between the host application 112a and a logical path resource has been established as a result of the successful completion of the 'establish logical path' request, the host application 112a may perform I/O operations 204 with respect to the logical path resources with which the logical path was established.

In certain embodiments, the configuration of the logical path resources 108a . . . 108m may change via additions, removals, or modifications to the logical path resources 108a . . . 108m. For example, new logical path resources may be added. If a host attempts to establish a logical path via an establish logical path message when no logical path resources are available, such an operation may result in generation of an out of resources condition. To prevent such an out of resources condition from occurring, in response to a change in the configuration of the logical path resources 108a . . . 108m, the path recovery application 114 may perform a path recovery operation.

Thus, the host application 112a can recover logical paths when a failure within a logical path is detected. More specifically, with the path recover application 114, although a host 104 has not grouped its logical paths, the host 104 knows which logical paths it has available. When a host 104 detects a logical path failure, the host enters a path discovery mode of operation. If the host 104 continues to detect a logical path failure while operating in the logical path discovery mode of operation, the host 104 removes the logical path from a logical path mask, and the host 104 does not use the removed logical path again. In the case of ungrouped logical paths, the host 104 aborts the loading process because the host 104 does not have more paths available to continue the loading process. Thus, the path recovery application 114 allows the host 104 to continue a loading process even if the host 104 fails to recover a failed logical path.

Additionally, in certain embodiments, the path recovery application 114 creates a pseudo path group for ungrouped logical paths. Knowledge about the pseudo path group is maintained at the host level. When a host 104 initiates an IPL process or other process that does not require logical paths to be grouped, the host 104 invokes the pseudo path group process. In the pseudo path group process, all ungrouped logical paths known by the host 104 are grouped internally at the host level. The host 104 does not need to inform the storage controller 102 that the logical paths have been internally grouped. Once the host 104 creates a pseudo path group, the host behavior is the same as if the host 104 had grouped the logical paths. If a host 104 detects a logical path failure, the host 104 moves the logical path from a working mask of the pseudo path group to an intermediate failure mask. The logical path remains in the intermediate logical path mask until and unless the host 104 determines that additional logical paths are desired. For example, additional logical paths may be desired due to completing IPL and needing to group logical paths into a path group. When the host 104 determines that recovery of the failed logical paths is desired, the host 104 performs a logical path discovery operation for each logical path in the intermediate logical path mask. A logical path in the intermediate logical that is successfully recovered is moved back to the working pseudo path group mask. A logical path in the intermediate logical path that cannot be recovered is moved to a permanent failure logical path.

Figure 3:
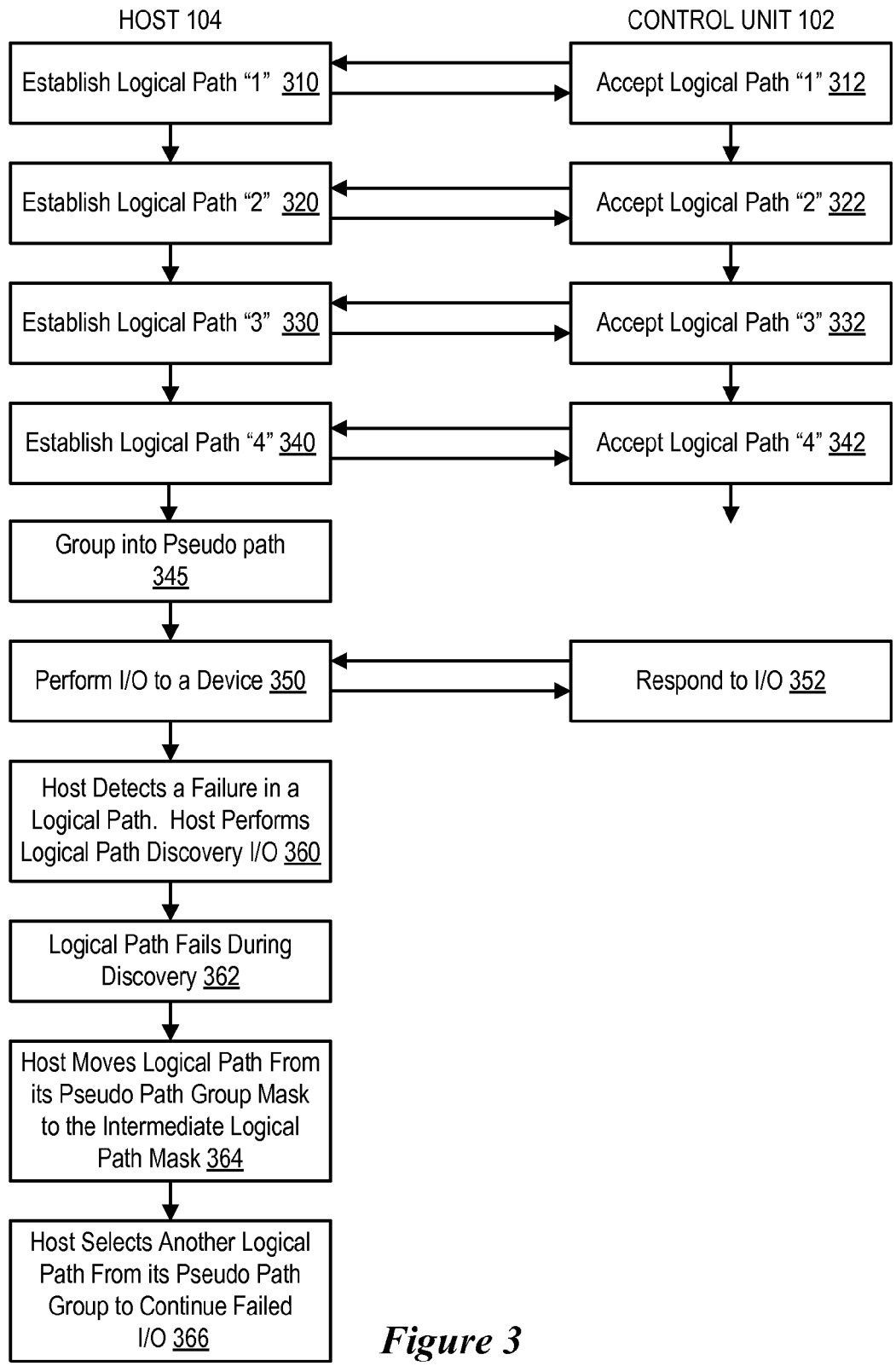
FIG. 3 shows a flow diagram of the operation of a system for recovering from ungrouped logical path failures, in accordance with certain embodiments.
Figure 4:
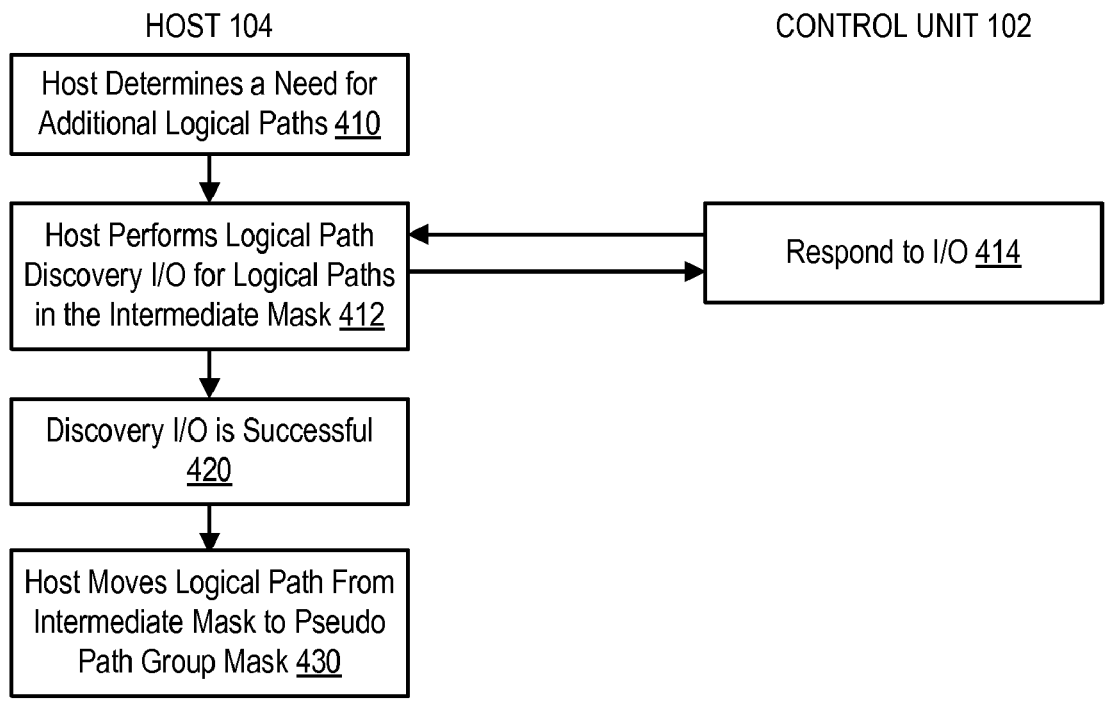
FIG. 4 shows a flow diagram of the operation of a system for recovering from ungrouped logical path failures, in accordance with certain embodiments.
Figure 5:
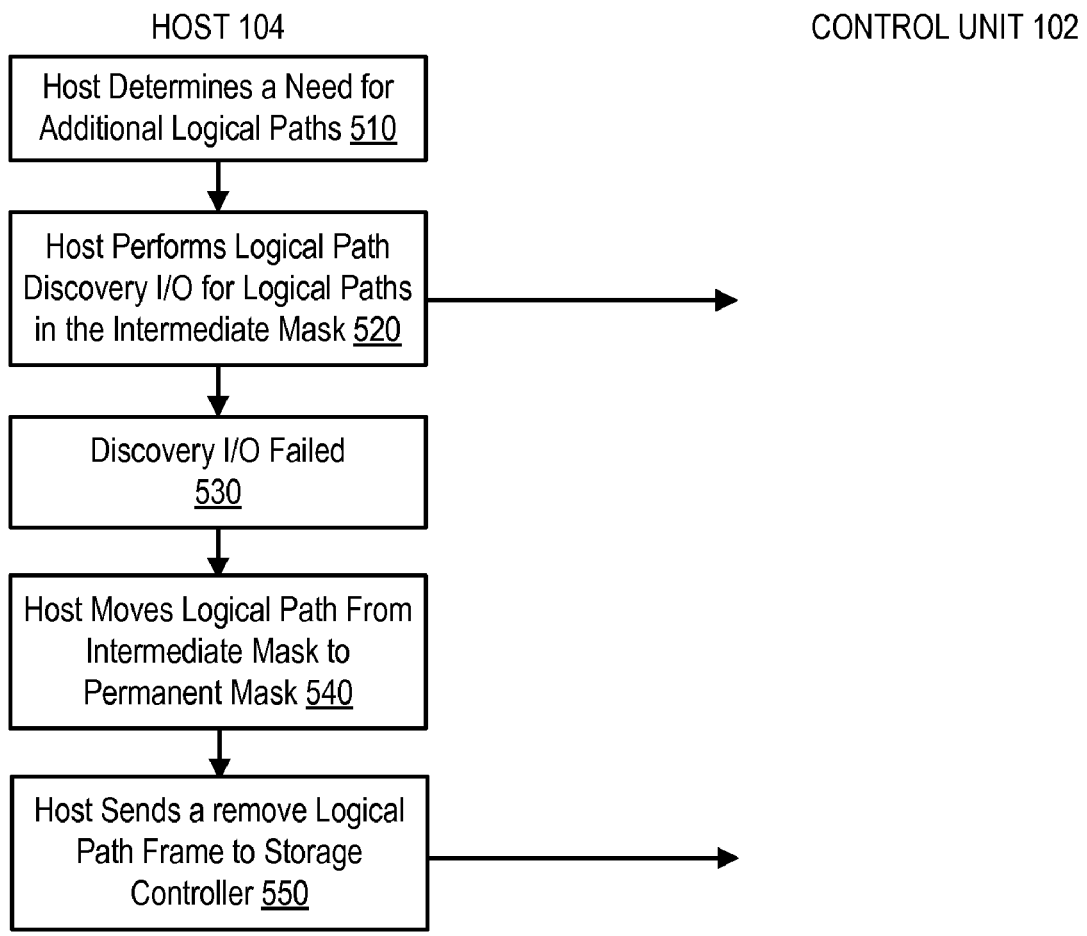
FIG. 5 shows a flow diagram of the operation of a system for recovering from ungrouped logical path failures, in accordance with certain embodiments; and, FIG. 6 illustrates a system in which certain embodiments are implemented.

FIG. 3-5 illustrate examples of operations performed by the path recovery application 114 in the storage control unit 102. In general, to recover a logical path, and to prevent a logical path failure, a host performs a plurality of operations.

More specifically, referring to FIG. 3, an example of operations performed by the path recovery application 114 when four logical paths are present and a logical path failure has been detected is shown. More specifically, in one embodiment, the host 104 sends an establish logical path (ELP) 1 message at step 310. Next, the control unit 102 accepts the establish logical path 1 message at step 312. Next the host 104 sends an establish logical path 2 message at step 320. Next, the control unit 102 accepts the establish logical path 2 message at step 322. Next the host 104 sends an establish logical path 3 message at step 330. Next, the control unit 102 accepts the establish logical path 3 message at step 332. Next the host 104 sends an establish logical path 4 message at step 340. Next, the control unit 102 accepts the establish logical path 4 message at step 342. Next, the host 104 performs the grouping of all established logical paths into a pseudo path group at step 345.

Next, the host 104 selects one path of the pseudo path group and performs an input/output (I/O) operation to a device at step 350 and the control unit 112 responds to the I/O operation at step 352. If, based upon the response, the host 104 detects a failure within the logical path to which the I/O operation was directed, then the host 102 performs a logical path discovery I/O operation at step 360. If during the logical path discovery I/O operation the logical path to which discovery I/O operation is directed fails, as determined at step 362, then the host moves a logical path from the pseudo path group mask to an intermediate logical path mask at step 364. The host 104 then selects another logical path from the pseudo path group (i.e., the host replaces the logical path) to enable executing of the failed I/O operation at step 366.

Referring to FIG. 4, an example of operations performed by the path recovery application 114 when a host determines that recovery of a logical path is desirable and the host is able to recover logical paths is shown. When the host 104 detects a condition that will require accessibility to more logical paths, the host enters into the logical path recovery mode. In the logical path recovery mode of operation, the host 104 performs a logical path discovery operation for each logical path in the intermediate logical path mask. A logical path in the intermediate logical that is successfully recovered is moved back to the pseudo logical path mask. A logical path in the intermediate logical path that cannot be recovered is moved to the permanent failure logical path.

More specifically, if the host 104 determines a need for additional paths at step 410, then the host 104 performs a logical path discovery I/O operation for logical paths that are include within the intermediate mask at step 412. The control unit 102 responds to the I/O operation at step 414. Based upon the response, the host determines that the discovery I/O operation was successful at step 420. Next, the host moves the logical path from the intermediate mask to the pseudo path group mask at step 430.

Referring to FIG. 5, an example of operations performed by path recovery application 114 when a host 104 determines that recovery of logical paths is desirable and the host is unable to recover logical paths is shown. For logical paths in the permanent failure logical mask, the host will send a remove Logical path frame to the storage controller More specifically, when a host determines a need for additional logical paths at step 510, the host performs a logical path discovery I/O operation for logical paths in the intermediate mask at step 520. By the control unit 102 not responding to the discovery I/O operation, the host can determine that the discovery I/O operation failed at step 530. Net, the host 104 moves the logical path that caused the failed discovery I/O operation from the intermediate mask to the permanent mask at step 540. Next, the host sends a remove logical path frame indication to the storage controller 102 at step 550.

The described techniques may be implemented as a method, apparatus, or article of manufacture involving software, firmware, micro-code, hardware, and/or any combination thereof. The term "article of manufacture" as used herein refers to program instructions, code and/or logic implemented in circuitry (e.g., an integrated circuit chip, Programmable Gate Array (PGA), ASIC, etc.) and/or a computer readable medium (e.g., magnetic storage medium, such as hard disk drive, floppy disk, tape), optical storage (e.g., CD-ROM, DVD-ROM, optical disk, etc.), volatile and non-volatile memory device (e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.). Code in the computer readable medium may be accessed and executed by a machine, such as, a processor. In certain embodiments, the code in which embodiments are made may further be accessible through a transmission medium or from a file server via a network. In such cases, the article of manufacture in which the code is implemented may comprise a transmission medium, such as a network transmission line, wireless transmission media, signals propagating through space, radio waves, infrared signals, etc. Of course, those skilled in the art will recognize that many modifications may be made without departing from the scope of the embodiments, and that the article of manufacture may comprise any information-bearing medium known in the art. For example, the article of manufacture comprises a storage medium having stored therein instructions that when executed by a machine results in operations being performed.

Figure 6:
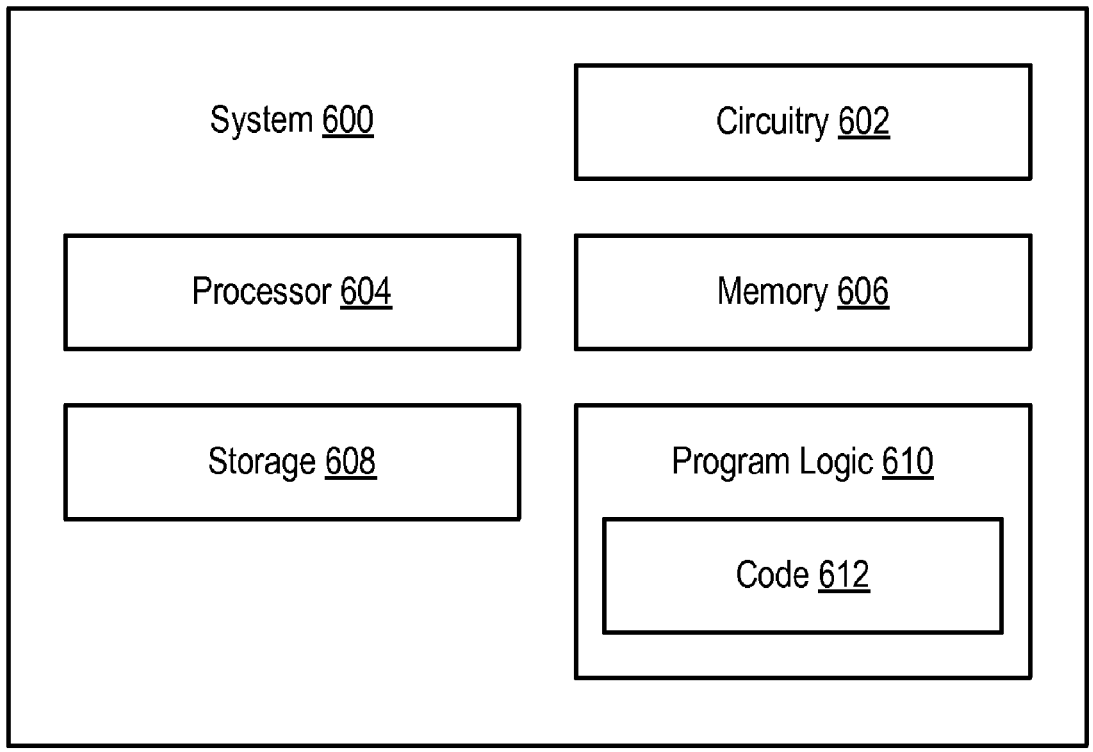

FIG. 6 illustrates a block diagram of a system 600 in which certain embodiments may be implemented. In certain embodiments, the storage control unit 102 and the hosts 104*a* . . . 104*n* may be implemented in accordance with the system 600. The system 600 may include circuitry 602 that may in certain embodiments include a processor 604. The system 600 may also include a memory 606 (e.g., a volatile memory device), and storage 608. Certain elements of the system 600 may or may not be found in the storage control unit 102 or the hosts 104*a* . . . 104*n*. The storage 608 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 608 may comprise an internal storage device, an attached storage device, and/or a network accessible storage device. The system 600 may include program logic 610 including code 612 that may be loaded into the memory 606 and executed by the processor 604 or circuitry 602. In certain embodiments, the program logic 610 including code 612 may be stored in the storage 608. In certain other embodiments, the program logic 610 may be implemented in the circuitry 602. Therefore, while FIG. 6 shows the program logic 610 separately from the other elements, the program logic 610 may be implemented in the memory 606 or the circuitry 602.

Certain embodiments may be directed to a method for deploying computing instruction by a person or automated processing integrating computer-readable code into a computing system, where the code in combination with the computing system is enabled to perform the operations of the described embodiments. In certain embodiments, different storage systems may be used in the computing environment, such as Redundant Array of Independent Disks (RAID), just a bunch of disks (JBOD), Direct Access Storage Device (DASD), tape, etc.

At least certain of the operations of FIGS. 2-5 may be performed in parallel as well as sequentially. In alternative embodiments, certain of the operations may be performed in a different order, modified, or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-6 are described as having specific types of information. In alternative embodiments, the data structures and components may be structured differently and have fewer, more, or different fields or different functions than those shown or referred to in the figures.

Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method for recovering from a logical failure comprising:
   detecting a logical path failure;
   entering a path discovery mode of operation upon detection of a logical path failure;
   performing a logical path recovery operation, the logical path recovery operation removing the logical path from a group of available logical paths and performing an establish a logical path operation after removing the logical path from the group of available logical paths;
   creating a pseudo path group for ungrouped logical paths, the pseudo path group providing a grouping of logical paths at a host level; and, when performing an initial program load process for a logical path not requiring a group of logical paths, using the pseudo path group provided at the host level to perform the initial program load process.

2. The method of claim 1 wherein:
the detecting the logical path failure occurs in response to an establish logical path operation.

3. The method of claim 1 wherein:
the group of available logical paths are identified within a logical path mask; and
the removing the logical path from a group of available logical path comprises removing an identification of the logical path from the logical path mask.

4. The method of claim 1 further comprising:
identifying the pseudo path group of logical paths within a pseudo path group logical mask.

5. The method of claim 4 further comprising:
moving a logical path from the pseudo path group logical mask to an intermediate failure mask upon detection of a logical path failure of a logical path identified within the pseudo path group logical mask, the logical path remaining in the intermediate logical path mask until and unless it is determined that additional logical paths are desired.

6. A system comprising:
a processor; and,
a computer-usable medium embodying computer program code, the computer program code comprising instructions executable by the processor and configured for:
detecting a logical path failure;
entering a path discovery mode of operation upon detection of a logical path failure;
performing a logical path recovery operation, the logical path recovery operation removing the logical path from a group of available logical paths and performing an establish a logical path operation after removing the logical path from the group of available logical paths;
creating a pseudo path group for ungrouped logical paths, the pseudo path group providing a grouping of logical paths at a host level; and, wherein
when performing an initial program load process for a logical path not requiring a group of logical paths, using the pseudo path group provided at the host level to perform the initial program load process.

7. The system of claim 6 wherein:
the detecting the logical path failure occurs in response to an establish logical path operation.

8. The system of claim 6 wherein the computer program code further comprises instructions for
identifying the pseudo path group of logical paths within a pseudo path group logical mask.

9. The system of claim 8 wherein the computer program code further comprises instructions for
moving a logical path from the pseudo path group logical mask to an intermediate failure mask upon detection of a logical path failure of a logical path identified within the pseudo path group logical mask, the logical path remaining in the intermediate logical path mask until and unless it is determined that additional logical paths are desired.

10. A non-transitory computer-usable medium embodying computer program code, the computer program code comprising computer executable instructions configured for:
detecting a logical path failure;
entering a path discovery mode of operation upon detection of a logical path failure;
performing a logical path recovery operation, the logical path recovery operation removing the logical path from a group of available logical paths and performing an establish a logical path operation after removing the logical path from the group of available logical paths;
creating a pseudo path group for ungrouped logical paths, the pseudo path group providing a grouping of logical paths at a host level; and, wherein
when performing an initial program load process for a logical path not requiring a group of logical paths, using the pseudo path group provided at the host level to perform the initial program load process.

11. The computer-usable medium of claim 10 wherein:
the detecting the logical path failure occurs in response to an establish logical path operation.

12. The computer-usable medium of claim 10 wherein:
the group of available logical paths are identified within a logical path mask; and
the removing the logical path from a group of available logical path comprises removing an identification of the logical path from the logical path mask.

13. The computer-usable medium of claim 10 wherein the computer program code further comprises instructions for
identifying the pseudo path group of logical paths within a pseudo path group logical mask.

14. The computer-usable medium of claim 13 wherein the computer program code further comprises instructions for
moving a logical path from the pseudo path group logical mask to an intermediate failure mask upon detection of a logical path failure of a logical path identified within the pseudo path group logical mask, the logical path remaining in the intermediate logical path mask until and unless it is determined that additional logical paths are desired.

\* \* \* \* \*